W. BARTHOLOMEW.
BEARING FOR VERTICAL SHAFTS.
APPLICATION FILED JULY 3, 1913.
1,213,145.
Patented Jan. 23, 1917.
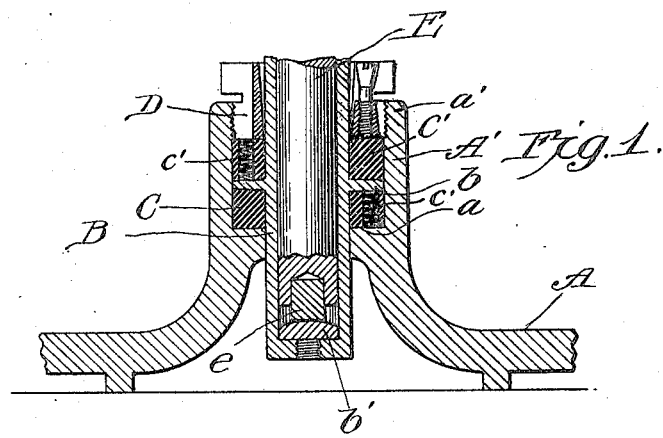
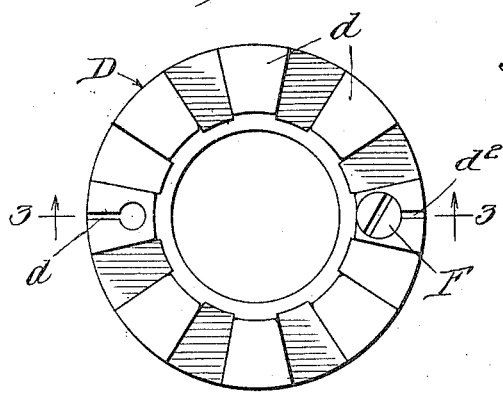
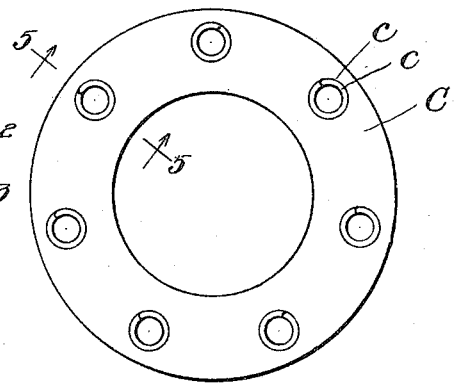
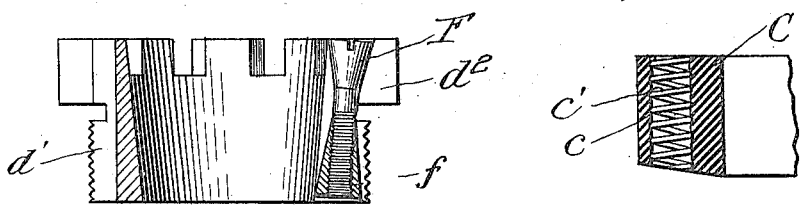
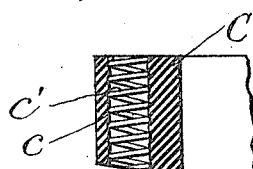
Witnesses:
Harry S. Gaither
E. M. Anderson
Inventor.
William Bartholomew
by Sheridan, Wilkinson, Scott & Richmond
Attys

UNITED STATES PATENT OFFICE.

WILLIAM BARTHOLOMEW, OF CHICAGO, ILLINOIS, ASSIGNOR TO TROY LAUNDRY MACHINERY COMPANY, LTD., A CORPORATION OF NEW YORK.

BEARING FOR VERTICAL SHAFTS.

1,213,145.　　　　Specification of Letters Patent.　　Patented Jan. 23, 1917.

Application filed July 3, 1913.　Serial No. 777,296.

*To all whom it may concern:*

Be it known that I, WILLIAM BARTHOLOMEW, a citizen of the United States, residing at Chicago, in the county of Cook and State of Illinois, have invented certain new and useful Improvements in Bearings for Vertical Shafts, of which the following is a specification.

My invention relates in general to step bearings for vertical shafts, and more particularly to the means for packing such bearings.

It is necessary that the lower end of a rotary vertical spindle or shaft which carries a load at its upper end, such, for instance, as the spindle of the basket of a centrifugal extractor, should be so supported as to have a limited lateral yielding, and at the same time so rigidly as to be maintained in substantially vertical position. This is sometimes accomplished in centrifugal extractors by mounting the lower end of the spindle within a sleeve, an annular nut being provided to engage within the upper end of the bearing box and to impart to the packing rings the requisite pressure to securely support the sleeve. In such a construction the wear upon the packing rings necessitates their frequent renewal and the strains often strip the engaged threads of the nut and bearing box.

The primary object of my invention is to provide, in a step bearing of the construction referred to, an improved packing ring which will be durable and at the same time have the requisite resiliency, and also to provide a pressure nut which may be adjusted to take up the wear on the engaged screw threads of the nut and bearing box, and which will maintain the necessary pressure on the packing rings, should the engaged threads be stripped.

A further object of my invention is to provide an improved resilient packing ring which will be durable in usage, and at the same time possess the necessary elasticity.

My invention will be more fully hereinafter disclosed with reference to the accompanying drawing, in which the same is illustrated as embodied in a convenient and practical form, and in which—

Figure 1 is a vertical sectional view; Fig. 2 is an enlarged plan view of the expansible nut; Fig. 3 is a vertical section, taken on the line 3—3 of Fig. 2; Fig. 4 is a plan view of the reinforced packing ring; and Fig. 5 is a sectional detail, taken on the line 5—5 of Fig. 4.

The same reference characters are used to designate the same parts in the several figures of the drawing.

Reference letter A designates a portion of the base of a machine, such, for instance, as a centrifugal extractor, which supports the lower end of a rotary spindle or shaft. A' designates a bearing box having an open interiorly screw-threaded upper end $a'$ and an inwardly projecting annular flange $a$ at its lower end. The bearing box is preferably formed integral with the supporting base.

B designates a vertical sleeve extending concentrically with the bearing box A', and provided with an outwardly projecting flange $b$ fitting within the inner cylindrical wall of the bearing box.

C designates an annular packing ring surrounding the bearing sleeve B below the flange $b$, and closely fitting within the bearing box A'. A second annular packing ring C' surrounds the sleeve above the flange $b$ and also fits closely within the surrounding portion of the bearing box.

D designates an annular exteriorly screw-threaded nut, which engages with the screw threads in the upper end $a'$ of the bearing box. The upper surface of this nut is provided with lugs or teeth $d$, by means of which it may be rotated, and thereby vertically adjusted within the bearing box.

E designates the lower end of a vertical rotary shaft or spindle, such, for instance, as the spindle which supports at its upper end the basket of a centrifugal extractor. The spindle E rotates within the sleeve B, and is supported at its lower end upon the closed lower end of the sleeve by any suitable means, such, for instance, as a bearing block *e* in the lower end of the shaft, which rests upon a removable seat *b'* secured within the lower end of the sleeve.

The sleeve B is securely supported upon the base, but so as to yield slightly relatively thereto, in order that it may support the rotary spindle in a vertical position and at the same time permit a slight lateral play thereof necessarily incident to the rotation of the basket which it supports at its upper end. This support is effected by means of the annular washers above and below the flange *b* on the sleeve and interposed between the lower annular wall *a* of the bearing box and the lower end of the annular nut D. By rotating the annular nut relatively to the bearing box in a direction to move the nut downwardly, pressure is imparted to the upper annular packing ring C', and also to the lower packing ring C. The compression of the packing rings expands them sufficiently to completely fill the annular spaces above and below the flange *b* and between the outer surface of the sleeve and the inner wall of the bearing box. The sleeve is thereby securely supported, but the resiliency of the packing rings permits the necessary lateral yielding thereof to permit the lower end of the spindle to have the requisite flexibility of support.

In the operation of the bearing box the compression to which the packing rings are subjected is such that they soon wear out, inasmuch as they must be made of a material possessing sufficient elasticity to permit the lateral yielding of the sleeve which they surround, and at the same time securely support such sleeve normally in a vertical position. In order to increase the durability of such packing rings, I have provided them with reinforcing springs *c'*, located in the openings *c*. The coiled springs extend in the direction of the compressive strains, and hence reinforce the material of which the packing rings are made, which is ordinarily a rubber composition. The springs resist the crushing strains to which the packing rings are subjected, and at the same time contribute to the necessary resiliency of the packing rings. The provision of the reinforcing coiled springs in the packing rings, therefore, increases the durability of such rings, without impairing their efficiency.

The engaged threads on the exterior of the nuts D and on the interior of the upper end *a'* of the journal box are subjected to severe strains, owing to the fact that the nut must exert a great degree of pressure upon the packing ring in order that they may securely support the bearing sleeve. Consequently, the engaged threads on the nut and bearing box are subjected to a great deal of wear, and sometimes the threads are even stripped, owing to the excessive pressure with which the nut engages the packing rings. In order to compensate for the wear on the engaged threads of the annular nut and bearing box, and to insure the nut maintaining the requisite pressure upon the packing rings, I so construct the annular nut that it may be radially adjustable. This I accomplish by cutting the annular nut completely through at one side thereof, as shown at $d^2$, and by forming a saw cut *d'* partially through the opposite side of the annular nut. Between the ends formed by the saw cut I insert a wedging device, comprising a bolt F having a conical head, which engages a conical nut *f*. The conical head of the bolt and the conical nut are seated within correspondingly shaped recesses formed between the surfaces of the nut D adjacent the saw cut $d^2$. By rotating the bolt F relatively to the nut *f*, the head of the bolt and the nut are drawn together, thereby expanding the annular nut D, such expansion being facilitated by the saw cut *d'*, which extends from the outer surface partially through the annular nut at the side thereof opposite the wedging device.

By means of the wedging device the annular nut D may be expanded so as to grip the surrounding surface of the bearing box with such a degree of pressure as to positively retain the packing rings under the desired compression.

From the foregoing description it will be observed that I have invented an improved reinforcing packing ring, particularly adapted for use in step bearings, which will be durable in use and at the same time possess the required elasticity.

It will be further observed that I have invented an improved expansible annular nut, particularly adapted for imparting pressure to the annular packing rings of a step bearing, which may be readily so adjusted as to take up wear on the threads thereof, or upon the engaged threads within the end of the bearing box, and thereby maintain the packing rings under the desired compression.

I claim:—

1. A resilient packing ring comprising reinforcing coiled springs embedded therein of greater compressive resistibility than the material of which the ring is formed.

2. An annular resilient packing ring comprising therein axially arranged reinforcing coiled springs of greater compressive resistibility than the material of which the ring is formed.

3. A resilient packing ring having reinforcing coiled springs of greater compressive resistibility than the material of which the ring is formed extending therein in alinement with the direction of pressure to which the ring is subjected.

4. An annular packing ring for yieldingly resisting axial and radial compression formed of a resilient material having embedded therein coil springs of greater compressive resistibility than said material.

5. An annular packing ring formed of rubber having embedded therein coil springs to increase the resistance of the ring to axial and radial compressions.

In testimony whereof, I have subscribed my name.

WILLIAM BARTHOLOMEW.

Witnesses:
C. M. LEARY,
D. S. MANN.